United States Patent
Pink et al.

(10) Patent No.: US 10,071,744 B2
(45) Date of Patent: Sep. 11, 2018

(54) METHOD, COMPUTER PROGRAM, STORAGE MEDIUM AND ELECTRONIC CONTROL UNIT FOR OPERATING A VEHICLE

(71) Applicant: Robert Bosch GmbH, Stuttgart (DE)

(72) Inventors: Oliver Pink, Stuttgart (DE); Christoph Schroeder, Pleidelsheim (DE); Stefan Nordbruch, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 55 days.

(21) Appl. No.: 15/371,813

(22) Filed: Dec. 7, 2016

(65) Prior Publication Data

US 2017/0158205 A1    Jun. 8, 2017

(30) Foreign Application Priority Data

Dec. 8, 2015   (DE) .................. 10 2015 224 553

(51) Int. Cl.
   *B60W 50/00*   (2006.01)
   *B60W 30/14*   (2006.01)
   (Continued)

(52) U.S. Cl.
   CPC ........ *B60W 50/0098* (2013.01); *B60W 30/08* (2013.01); *B60W 30/146* (2013.01);
   (Continued)

(58) Field of Classification Search
   CPC .... B60W 30/08; B60W 30/09; B60W 30/143; B60W 30/146; B60W 50/0098; G05D 1/0223
   See application file for complete search history.

(56) References Cited

U.S. PATENT DOCUMENTS 5,014,200 A * 5/1991 Chundrlik .......... B60K 31/0008
                                                180/167
5,530,651 A * 6/1996 Uemura .................... B60T 7/22
                                                180/169
(Continued)

FOREIGN PATENT DOCUMENTS

BE          1005717 A3 * 12/1993
DE     102012112802 A1    6/2014
(Continued)

OTHER PUBLICATIONS

JPO machine translation of JP 10-124799 (original JP document published May 15, 1998) (Year: 1998).*

*Primary Examiner* — Behrang Badii
*Assistant Examiner* — David A Testardi
(74) *Attorney, Agent, or Firm* — Norton Rose Fulbright US LLP; Gerard Messina

(57) ABSTRACT

A method for operating a vehicle including at least one assistance function or at least a partially automated driving function, including: ascertaining at least one safe driving state; capturing the current driving state; determining a permissible range for the current driving state of the vehicle from which at least one of the at least one safe driving state is attainable; operating the vehicle using an activable or active assistance function or an at least partially automated driving function within the specified permissible range.

9 Claims, 3 Drawing Sheets

(51) Int. Cl.
*G05D 1/02* (2006.01)
*B60W 30/08* (2012.01)
*B60W 30/16* (2012.01)
*B60W 40/04* (2006.01)
*G08G 1/16* (2006.01)
*B60W 50/04* (2006.01)

(52) U.S. Cl.
CPC .......... *B60W 30/162* (2013.01); *B60W 40/04* (2013.01); *B60W 50/045* (2013.01); *G05D 1/0223* (2013.01); *G08G 1/16* (2013.01); *B60W 2050/0095* (2013.01); *B60W 2520/10* (2013.01); *B60W 2550/12* (2013.01); *B60W 2550/141* (2013.01); *B60W 2550/302* (2013.01); *B60W 2550/308* (2013.01); *B60Y 2302/05* (2013.01)

(56) References Cited

U.S. PATENT DOCUMENTS

| | | | | |
|---|---|---|---|---|
| 6,324,462 | B1* | 11/2001 | Kageyama | G05D 1/0223 180/167 |
| 8,589,014 | B2* | 11/2013 | Fairfield | G05D 1/024 701/28 |
| 2007/0297288 | A1* | 12/2007 | Boecker | B60W 30/16 367/96 |
| 2008/0270001 | A1* | 10/2008 | Seto | B60K 31/00 701/93 |
| 2010/0161195 | A1* | 6/2010 | Shin | B60W 10/06 701/93 |
| 2010/0282209 | A1* | 11/2010 | Gray | B60K 31/047 123/350 |
| 2012/0083982 | A1* | 4/2012 | Bonefas | G05D 1/0223 701/70 |
| 2012/0215416 | A1* | 8/2012 | Poulin | B60W 30/146 701/93 |
| 2015/0175178 | A1* | 6/2015 | Ignatius | B61L 23/041 246/120 |
| 2015/0239396 | A1* | 8/2015 | Gjikokaj | G06K 9/00791 340/461 |
| 2015/0375744 | A1* | 12/2015 | Kato | B60W 30/16 701/96 |
| 2016/0086487 | A1* | 3/2016 | Abraham | H04W 4/046 340/905 |
| 2016/0282874 | A1* | 9/2016 | Kurata | G05D 1/0289 |
| 2017/0131401 | A1* | 5/2017 | Pascheka | B60W 30/095 |

FOREIGN PATENT DOCUMENTS

| | | | | |
|---|---|---|---|---|
| JP | 04232130 | A | * | 8/1992 |
| JP | 05174296 | A | * | 7/1993 |
| JP | 10016734 | A | * | 1/1998 |
| JP | 10124799 | A | * | 5/1998 |
| JP | 2010134656 | A | * | 6/2010 |
| JP | 2013177098 | A | * | 9/2013 |
| JP | 2015094994 | A | * | 5/2015 ........... G05D 1/0257 |

* cited by examiner

METHOD, COMPUTER PROGRAM, STORAGE MEDIUM AND ELECTRONIC CONTROL UNIT FOR OPERATING A VEHICLE

RELATED APPLICATION INFORMATION

The present application claims priority to and the benefit of German patent application no. 10 2015 224 553.5, which was filed in Germany on Dec. 8, 2015, the disclosure of which is incorporated herein by reference.

FIELD OF THE INVENTION

The present invention relates to a method, computer program, storage medium and electronic control unit for operating a vehicle.

BACKGROUND INFORMATION

It is often intended that driver assistance systems and automated driving functions only be usable in specified driving situations, for example, within a predefined velocity range or for certain road classes, such as expressways. To ensure that the driver does not use the functions outside of these ranges, criteria, such as vehicle velocity, are monitored, for example, outside of which an activation is not possible. Or, in response to activation of the system, a take-over request to the driver is initiated.

SUMMARY OF THE INVENTION

The present invention includes a method that makes it possible to specify the system limits, therefore, a permissible range, for example, the maximum permissible velocity, for the current driving situation on the basis of the attainability of safe driving states.

This makes it possible for the system limits to be dynamically specified. Here the advantage is derived that the system limits are more narrowly defined in higher risk situations and may be more broadly defined in lower risk situations.

Thus, the user has a larger and, at the same time, safer range for using the at least partially automated driving function.

The permitted driving states of a vehicle, respectively the system limits, respectively the permissible range for a driving state having an activated assistance function or at least a partially automated driving function are, therefore, derived from the total of all driving states from which at least one defined or predefined safe state is attainable.

In this regard, the present invention provides a method for operating a vehicle (FZG) including at least one assistance function or at least a partially automated driving function including the steps of:
ascertaining at least one safe driving state;
capturing the current driving state;
determining a permissible range for a driving state/the current driving state of the vehicle from which at least one of the at least one safe driving state is attainable;
operating the vehicle using an activable or active assistance function or an at least partially automated driving function within the specified permissible range.

An assistance function, respectively partially automated driving functions is/are understood here to be vehicle functions that refer generally to controlling the vehicle and particularly to interventions into the longitudinal or lateral guidance of the vehicle.

The functions are suited for minimizing the complexity of the driving task and thus for assisting the driver in controlling the vehicle or, at the highest level, of completely relieving the driver from the task of controlling the vehicle.

Safe driving states, in particular the following states, may be understood here to refer to:
the vehicle is at a standstill;
the vehicle is at a standstill in its own lane;
the vehicle is at a standstill in a breakdown lane or in an emergency stop bay;
the vehicle is at a standstill in a parking lot;
the vehicle is moving at a predefined speed.

A driving state may be described here using one or a plurality of variable parameters, for example:
the position of the vehicle;
the distance to a second vehicle, in particular to a vehicle driving ahead;
the current absolute velocity of the vehicle;
the current velocity relative to a second vehicle, in particular to a vehicle driving ahead;
the distance to a road infrastructure element, in particular to a roadside structure.

One advantageous specific embodiment provides that a current driving situation be captured and that the permissible range be specified in the determining step as a function of the captured driving situation.

In comparison with a set value for the system limits, for example, a fixed maximum velocity, this specific embodiment of the present invention, in particular, has the advantage that the function may be activated for a longer period of time with, for example, a reduced range of functions (at a lower velocity, for example, in tight situations), respectively in especially uncritical situations, may have a greater range of functions (at a higher velocity, for example, if the road is clear).

Therefore, in the present case, a permissible range may be understood to be the parameters of a driving state within which a safe operation of the function may be ensured.

This may be accomplished, for example, by deriving different minimum and maximum values for the parameters of the driving state as a function of the current driving situation.

In this context, depending on the current situation, there may be one or a plurality of permissible, safe states (for example, a plurality of positions in an emergency stopping lane, etc.).

Thus, in the step of determining at least one safe driving state, one embodiment of this specific embodiment provides that the at least one safe driving state be ascertained as a function of the current driving situation.

Here the advantage is derived that an adapted quantity of safe driving states is accessed as a function of the current driving situation. This simplifies the process of determining the permissible range since, in certain circumstances, fewer safe driving states are to be considered.

Many known heuristics for limiting functions may be described from the assessment of the attainability of a safe state. Examples include:
visibility conditions (fog): limited sight distance reduces the allowable maximum speed (reaching the safe state within the sight distance);
road condition (slippery ice): increased safety distance to the vehicle ahead, in order to achieve the safe state even using less braking deceleration; reduced velocity, to be able to stay in lane even during cornering (in the case that this is required by the predefined safe state);

traffic density (traffic jam): observing a minimum (braking distance) and maximum distance (sensor range) to the vehicle ahead, within which it may be ensured that the safe state is reached.

Thus, in the present case, a current driving situation may, in particular, be described by the following parameters:
- a visibility condition, in particular in the area surrounding the vehicle;
- a road condition, in particular in the area surrounding the vehicle;
- a traffic density, in particular in the area surrounding the vehicle.

It is advantageous when the ascertained permissible range is compared to the current driving state. In response to leaving the permissible range, the reaction takes place as a function of the current operating mode: If the vehicle is not in an at least partially automated operation, and, starting from the current driving state, there is no trajectory into the safe state, it is not possible to activate an at least partially automated driving function.

If an assistance function is active, or if the vehicle is in an at least partially automated operation, and no trajectory into a safe state is possible starting from the current or a predicted future driving state, then the dynamic behavior must be adapted to the function (for example, increase distance, reduce velocity). If an adaptation of the dynamic behavior is not possible, so that a trajectory into a safe state may again be found, then the assistance function, respectively the at least partially automated operation is ended.

Ending the assistance function, respectively the at least partially automated operation, may thereby include handing over the driving function to the driver.

Using this method, one or a plurality of driving states is/are specified, from which the safe state is attainable.

For that purpose, starting from a known safe state, for example, all trajectories that end in this state may be determined. The starting points of these trajectories then define the permissible range of the driving state within which the function may be active.

Thus, one advantageous specific embodiment provides that a trajectory group be used in the determining step to specify the permissible range; each trajectory of the trajectory group ending in at least one of the at least one safe driving state, and the permissible range being defined from the set of starting points of the trajectories of the trajectory group.

Specific embodiments of the present invention are illustrated and explained in the following with reference to the figures.

DETAILED DESCRIPTION

Figure 1A:
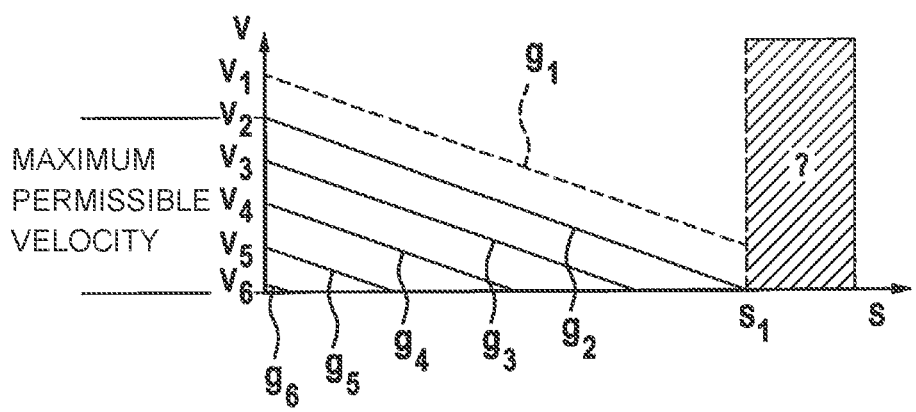
FIGS. 1a, 1B, and 1c shows a correlation between the parameter of the velocity of a driving state and of a distance ahead of the vehicle.
Figure 1B:
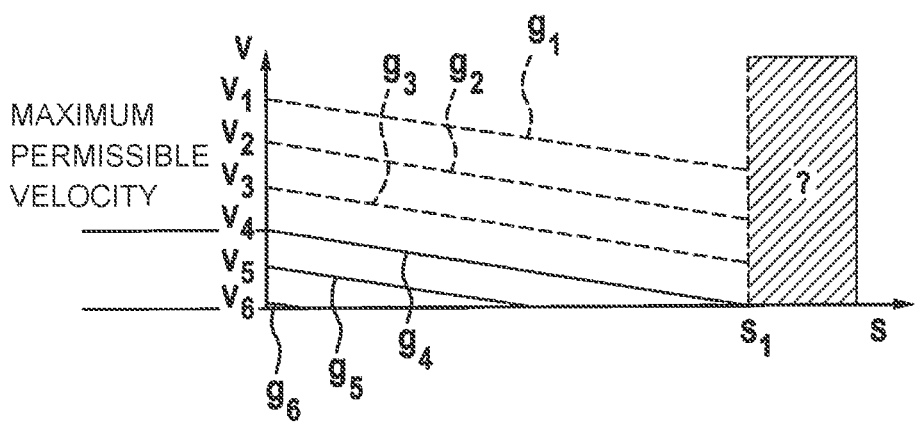
Figure 1C:
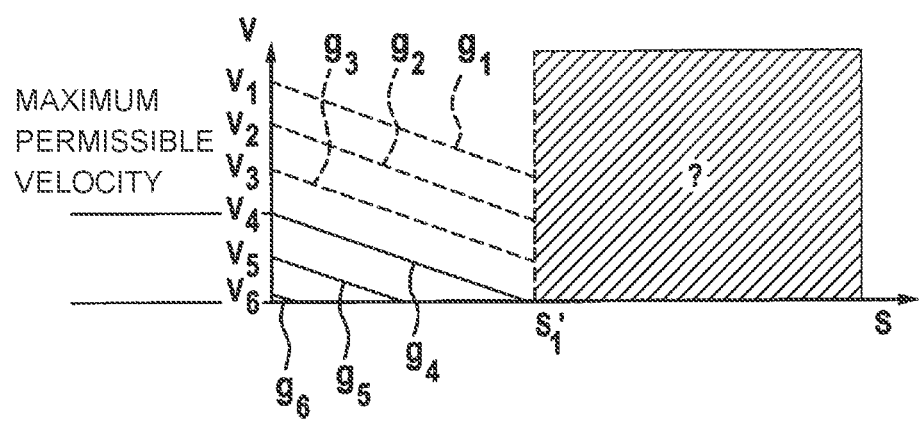

FIG. 1a through c show a correlation between parameter velocity V of a driving state and a distance S in front of vehicle FZG and how the system limits may be adapted to the current driving situation based on the example of maximum permissible velocity ($V_1$-$V_6$).

Velocity V is plotted on the ordinate. Distance S in front of vehicle FZG is plotted on the abscissa.

Distance $S_1$ is the current range of the sensor system of vehicle FZG, thus the "field of vision" of vehicle FZG for the at least partially automated driving function.

Straight lines $g_1$ through $g_6$ schematically show a braking curve as a function of the road coefficient of friction to be expected and of maximum permissible velocity (V1-V6) at the beginning of the braking maneuver.

The safe driving state to be reached may be assumed to be "vehicle at standstill," i.e., the velocity of vehicle FZG is 0 km/h.

In FIG. 1a, it is clearly discernible that straight line $g_1$ would only intersect the abscissa after distance $S_1$, i.e., in the area that is not visible to the sensors of vehicle FZG. This means that, at initial velocity $V_1$, vehicle FZG would not come to rest until in the area in front of vehicle FZG that is not visible. Accordingly, this velocity is classified as impermissible velocity since the safe state is not attainable. Therefore, specified permissible range B for the vehicle state parameter, velocity, includes merely the velocities up to a maximum of $V_2$.

A driving situation is shown in FIG. 1b where the coefficient of friction of the traveled road is lessened; i.e., the braking performance of vehicle FZG is reduced. Therefore, straight lines $g_1$ through $g_6$ have a smaller gradient. Straight lines $g_1$ through $g_3$ end on the abscissa only after distance $S_1$. Accordingly, in the situation sketched in FIG. 1b, permissible range B for the driving state parameter, velocity, is merely specified for the velocities up to $V_4$ at the maximum.

FIG. 1c exemplarily shows a driving situation where the coefficient of friction corresponds approximately to that of the driving situation of FIG. 1a. However, there is a reduced sight distance for the sensors of vehicle FZG. This means that distance $S_1'$ is shown to be shorter than distance $S_1$ in the driving situations in FIG. 1a and b.

Accordingly, permissible range B for driving state parameter, velocity V, is merely specified for the velocities up to $V_4$ at the maximum. This is because the safe state "vehicle is at a standstill" may only be ensured within the range that is visible to the sensors of vehicle FZG, starting from this maximum velocity in the context of the coefficient of friction to be expected.

Figure 2:
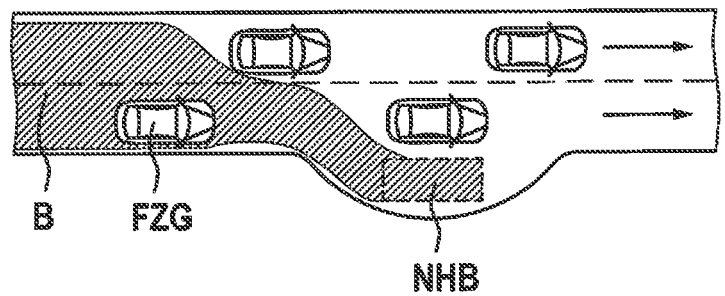
FIG. 2 shows a schematic representation of a permissible stop area.

FIG. 2 shows exemplarily a schematic representation of a permissible stop area.

FIG. 2 is an example of the driving state parameter "position of the vehicle." Permissible range B for this driving state parameter is illustrated by the hatched surface. The surface area has been specified in a way that allows a vehicle FZG located therein to attain the safe driving state "vehicle is at a standstill in an emergency stop bay NHB."

If the driving state of a vehicle FZG, here the position of vehicle FZG, is within this range, then the at least partially automated driving functions may be activated. Activation of the function outside of permissible range B for the position of vehicle FZG is not possible. Permissible range B must not be exited in response to activation of the driving function.

It is understood that the examples for permissible ranges B in accordance with FIG. 1a-c and FIG. 2 may be combined.

Figure 3:
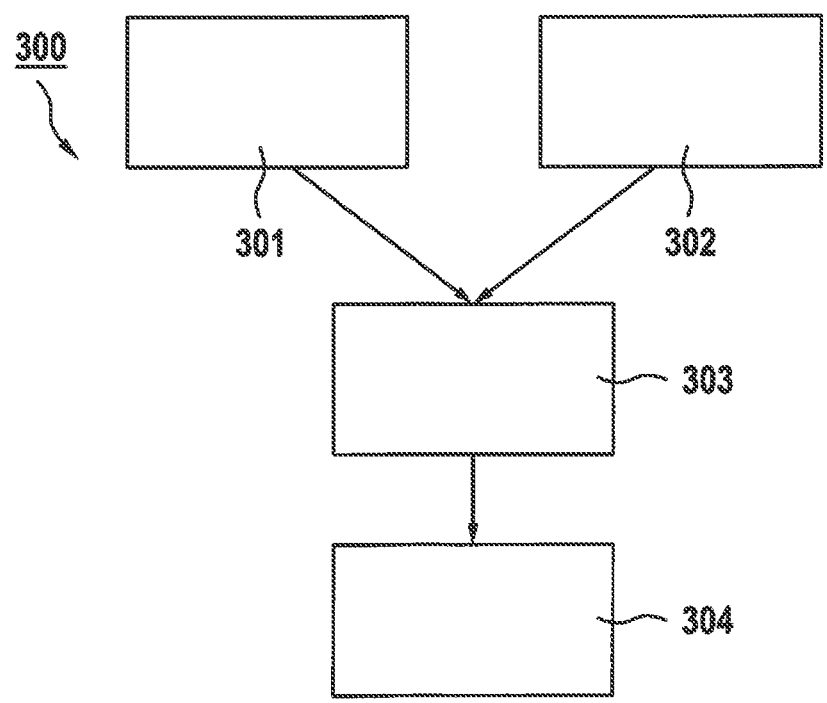
FIG. 3 shows a flow chart of a specific embodiment of the method in accordance with the present invention.

FIG. 3 shows a flow chart of a specific embodiment of method 300 in accordance with the present invention.

At least one safe driving state is ascertained in step 301.

The current driving step is captured in step 302. It is shown here in parallel. It is understood that step 302 may also be executed sequentially before or after step 301.

Permissible range B for the current driving state is specified in step 303. Permissible range B is specified in accordance with at least one of the at least one safe driving state being attained or being attainable from permissible range B.

In step 304, vehicle FZG is operated within permissible range B.

What is claimed is:

1. A method for operating a vehicle, which includes an at least partially automated driving operation, the method comprising:
    operating the vehicle, by a driver, with the at least partially automated operation inactive;
    ascertaining a safe driving state, the safe driving state being a state in which the vehicle is at a standstill within a determined distance from the vehicle, the determined distance being determined based on at least one of: (i) a range of a sensor system of the vehicle, and (ii) a coefficient of friction of a road on which the vehicle is currently operating;
    determining a current driving state of the vehicle, the current driving state including at least one of: (i) a distance to a second vehicle in front of the vehicle, (ii) a distance of a road infrastructure element in front of the vehicle, (iii) a current velocity of the vehicle, and (iv) a current velocity of the vehicle relative to the second vehicle in front of the vehicle;
    determining whether the safe driving state is attainable from the current driving state; and
    activating the at least partially automated operation of the vehicle based on the determination of whether the safe driving state is attainable, and operating the vehicle in the activated at least partially automated operation.

2. The method as recited in claim 1, further comprising:
    determining a range for the current driving state of the vehicle from which the safe driving state is attainable; and
    operating the vehicle in the activated at least partially automated operation within the range.

3. The method of claim 2, wherein the range is determined using a trajectory group, wherein each trajectory of the trajectory group represents a trajectory that starts with a possible driving state and ends in the safe driving state, and wherein the range is defined from a set of starting points of the trajectories of the trajectory group.

4. The method of claim 2, wherein the range is determined based on at least one of: (i) a visibility condition in an area surrounding the vehicle, (ii) a road condition in the area surrounding the vehicle, and (iii) a traffic density in the area surrounding the vehicle.

5. The method as recited in claim 1, wherein the at least partially automated operation of the vehicle is activated only when the safe driving state is determined to be attainable.

6. The method as recited in claim 1, wherein the determining of whether the safe driving state is attainable from the current driving state includes determining whether the safe driving state is attainable, from the current driving state, via at least a braking maneuver of the vehicle.

7. A non-transitory computer readable medium having a computer program, which is executable by a processor, comprising:
    a program code arrangement having program code for operating a vehicle, which includes an at least partially automated driving operation, by performing the following:
        operating the vehicle, by a driver, with the at least partially automated operation inactive;
        ascertaining a safe driving state, the safe driving state being a state in which the vehicle is at a standstill within a determined distance from the vehicle, the determined distance being determined based on at least one of: (i) a range of a sensor system of the vehicle, and (ii) a coefficient of friction of a road on which the vehicle is currently operating;
        determining a current driving state of the vehicle, the current driving state including at least one of: (i) a distance to a second vehicle in front of the vehicle, (ii) a distance of a road infrastructure element in front of the vehicle, (iii) a current velocity of the vehicle, and (iv) a current velocity of the vehicle relative to the second vehicle in front of the vehicle;
        determining whether the safe driving state is attainable from the current driving state; and
        activating the at least partially automated operation of the vehicle based on the determination of whether the safe driving state is attainable, and operating the vehicle in the activated at least partially automated operation within the determined range.

8. An electronic control unit for operating a vehicle, which includes an at least partially automated driving operation, the electronic control unit designed to:
    operate the vehicle, by a driver, with the at least partially automated operation inactive;
    ascertain a safe driving state, the safe driving state being a state in which the vehicle is at a standstill within a determined distance from the vehicle, the determined distance being determined based on at least one of: (i) a range of a sensor system of the vehicle, and (ii) a coefficient of friction of a road on which the vehicle is currently operating;
    determine a current driving state of the vehicle, the current driving state including at least one of: (i) a distance to a second vehicle in front of the vehicle, (ii) a distance of a road infrastructure element in front of the vehicle, (iii) a current velocity of the vehicle, and (iv) a current velocity of the vehicle relative to the second vehicle in front of the vehicle;
    determine whether the safe driving state is attainable from the current driving state; and
    activate the at least partially automated operation of the vehicle based on the determination of whether the safe driving state is attainable, and operate the vehicle in the activated at least partially automated operation within the determined range.

9. A method for operating a vehicle, which includes an at least partially automated driving operation, the method comprising:
    operating the vehicle in an at least partially automated operation of a driving function;
    ascertaining a safe driving state, the safe driving state being a state in which the vehicle is at a standstill within a determined distance from the vehicle, the determined distance being determined based on at least one of: (i) a range of a sensor system of the vehicle, and (ii) a coefficient of friction of a road on which the vehicle is currently operating;
    determining a current driving state of the vehicle, the current driving state including at least one of: (i) a distance to a second vehicle in front of the vehicle, (ii) a distance of a road infrastructure element in front of the vehicle, (iii) a current velocity of the vehicle, and (iv) a current velocity of the vehicle relative to the second vehicle in front of the vehicle;

determining a range for the current driving state of the vehicle from which the safe driving state is attainable;
comparing the determined range to the determined current driving state; and
terminating the at least partially automated operation based on the comparing, the terminating including handing over the driving function of the vehicle to a driver.

* * * * *